(12) United States Patent
Kobayashi

(10) Patent No.: US 8,610,937 B2
(45) Date of Patent: Dec. 17, 2013

(54) PRINTING SYSTEM, PRINTING APPARATUS, CONTROL METHOD AND PROGRAM

(75) Inventor: Makoto Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 13/182,319

(22) Filed: Jul. 13, 2011

(65) Prior Publication Data

US 2012/0026542 A1 Feb. 2, 2012

(30) Foreign Application Priority Data

Aug. 2, 2010 (JP) ................................. 2010-173964

(51) Int. Cl.
*G06F 15/00* (2006.01)
(52) U.S. Cl.
USPC ........................................................ 358/1.15
(58) Field of Classification Search
USPC ........................................................ 358/1.15
See application file for complete search history.

(56) References Cited

U.S. PATENT DOCUMENTS 7,213,138 B2 5/2007 Fukunaga et al.
2013/0050735 A1* 2/2013 Nuggehalli et al. ......... 358/1.13

FOREIGN PATENT DOCUMENTS

JP 2008-097580 A 4/2008

* cited by examiner

*Primary Examiner* — Saeid Ebrahimi Dehkordy

(57) ABSTRACT

A printing system includes a plurality of print data generation units that shares content serving as print source data and generates print data, a storage unit configured to store generated print data in a storage of the server in the generated order, an inquiry unit that periodically inquires whether print data is stored in the server, a document generation unit that, when there is an inquiry and generated print data is stored in the server, generates a document including a storage location of the print data, an analysis unit that receives the document from the server and analyzes information contained in the document, and a print control unit that, when a first page number of the print data analyzed and a last page number of print data already acquired by the printing apparatus are continuous, acquires the print data from the analyzed storage location and print the acquired print data.

10 Claims, 13 Drawing Sheets

F I G. 5A

```
PUT http://print-sv.queue.net/dev_0001queue/messages ———————— 501
? VisibilityTimeout=30                                ———————— 502
, messagettl=3600                                     ———————— 503
x-ms-date: Mon, 14 Sep 2009 17:00:25 GMT              ———————— 504
........MESSAGE DATA CONTENT........
<message>
 <request id = '0001' />                              ———————— 505   507
 <document id = 'd_00001'                             ———————— 506
  documentURI = http://print-sv.blob.net/dev_0001/document/document_001/1-2.doc />
  <result storedURI= 'http://print-sv.blob.net/dev_0001/atom.xml' /> ————— 508
</message>
```

F I G. 5B

```
PUT http://print-sv.queue.net/dev_0001queue/messages ———————— 501
? VisibilityTimeout=30                                ———————— 502
, messagettl=3600                                     ———————— 503
x-ms-date: Mon, 14 Sep 2009 17:00:25 GMT              ———————— 504
........MESSAGE DATA CONTENT........
<message>
 <request id = '0002' />                              ———————— 505   507
 <document id = 'd_00001'                             ———————— 506
  documentURI = http://print-sv.blob.net/dev_0001/document/document_001/3-5.doc />
  <result storedURI= 'http://print-sv.blob.net/dev_0001/atom.xml' /> ————— 508
</message>
```

F I G. 5C

```
PUT http://print-sv.queue.net/dev_0001queue/messages ———————— 501
? VisibilityTimeout=30                                ———————— 502
, messagettl=3600                                     ———————— 503
x-ms-date: Mon, 14 Sep 2009 17:00:25 GMT              ———————— 504
........MESSAGE DATA CONTENT........
<message>
 <request id = '0003' />                              ———————— 505   507
 <document id = 'd_00001'                             ———————— 506
  documentURI = http://print-sv.blob.net/dev_0001/document/document_001/6-10.doc />
  <result storedURI= 'http://print-sv.blob.net/dev_0001/atom.xml' /> ————— 508
</message>
```

FIG. 6A

| | QUEUE MANAGEMENT TABLE | | | |
|---|---|---|---|---|
| QUEUE ID | DEVICE ID | DEVICE MODEL | NUMBER OF INSTANCES | QUEUE LENGTH |
| 1001 | d_0001_1234 | Dev_0001 | 2 | 5 |
| 1002 | d_0010_5678 | Dev_0010 | 3 | 10 |

FIG. 6B

| | PROCESSING CONFIRMATION TABLE | |
|---|---|---|
| REQUEST ID | DOCUMENT ID | PRINT DATA STORAGE LOCATION |
| 0001 | d_00001 | http://print-sv.blob.net/dev_0001/atom.xml |
| 0003 | d_00001 | http://print-sv.blob.net/dev_0001/atom.xml |
| 0010 | d_00100 | |
| 0002 | d_00001 | http://print-sv.blob.net/dev_0001/atom.xml |

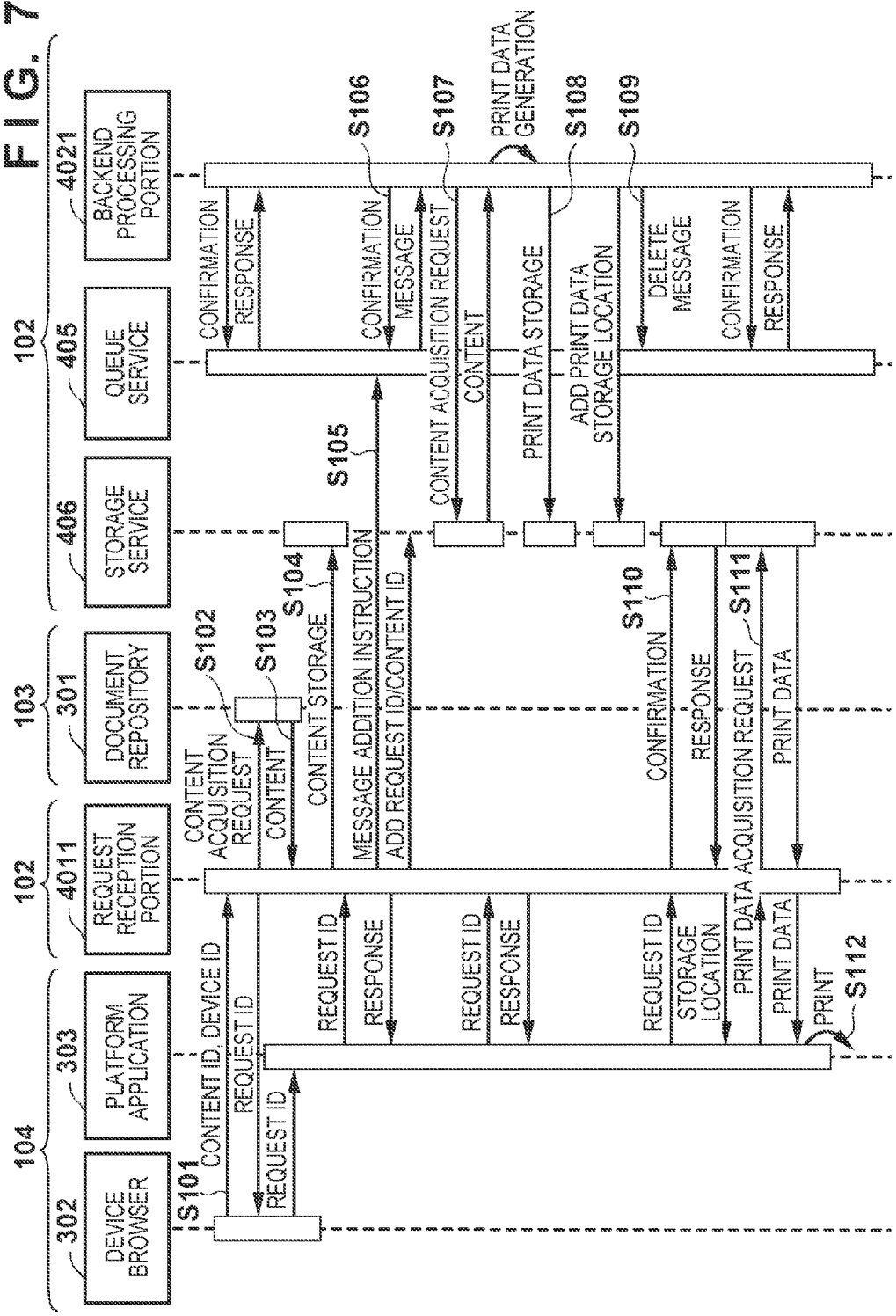

FIG. 11

```
<feed xmlns="http://www.w3.org/2005/Atom"
xml:lang="ja"
xml:base="http://print-sv.blob.net">
  <title>imageRunner Advance Print Service</title>
  <id>tag:print-sv.blob.net, 2009:/dev_0001/printdata</id>
  <link href="http://print-sv.blob.net/dev_0001"/>
  <updated>2009-11-01-T13:36:24+09:00</updated>
  <entry>
    <id> tag:print-sv.blob.net, 2009:/dev_0001/printdata/pdl0001/1-2</id>
    <title>Update: 20091018</title>
    <updated>2009-10-18T12:34:00+09:00</updated>
    <link rel="alternate"
    type="text/html"
    href="http://print-sv.blob.net/dev_0001/printdata/pdl0001_1-2/readme.html" />
    <content type="application/X-iradv"
    src="http://print-sv.blob.net/dev_0001/printdata/pdl0001_1-2.zip" />
  </entry>
  <entry>
    <id> tag:print-sv.blob.net, 2009:/dev_0001/printdata/pdl0001/6-10</id>
    <title>Update: 20091018</title>
    <updated>2009-10-18T12:34:00+09:00</updated>
    <link rel="alternate"
    type="text/html"
    href="http://print-sv.blob.net/dev_0001/printdata/pdl0001_6-10/readme.html" />
    <content type="application/X-iradv"
     src="http://print-sv.blob.net/dev_0001/printdata/pdl0001_6-10.zip" />
  </entry>
</feed>
```

F I G. 12

```
<feed xmlns="http://www.w3.org/2005/Atom"
xml:lang="ja"
xml:base="http://print-sv.blob.net">
  <title>imageRunner Advance Print Service</title>
  <id>tag:print-sv.blob.net, 2009:/dev_0001/printdata</id>
  <link href="http://print-sv.blob.net/dev_0001"/>
  <updated>2009-11-01-T13:36:24+09:00</updated>
  <entry>
    <id> tag:print-sv.blob.net, 2009:/dev_0001/printdata/pdl0001/1-2</id>
    <title>Update: 20091018</title>
    <updated>2009-10-18T12:34:00+09:00</updated>
    <link rel="alternate"
    type="text/html"
    href="http://print-sv.blob.net/dev_0001/printdata/pdl0001_1-2/readme.html" />
    <content type="application/X-iradv"
    src="http://print-sv.blob.net/dev_0001/printdata/pdl0001_1-2.zip" />
  </entry>
  <entry>
    <id> tag:print-sv.blob.net, 2009:/dev_0001/printdata/pdl0001/3-5</id>
    <title>Update: 20091019</title>
    <updated>2009-10-19T12:34:00+09:00</updated>
    <link rel="alternate"
    type="text/html"
    href="http://print-sv.blob.net/dev_0001/printdata/pdl0001_3-5/readme_.html" />
    <content type="application/X-iradv"
    src="http://print-sv.blob.net/dev_0001/printdata/pdl0001_3-5.zip" />
  </entry>
  <entry>
    <id> tag:print-sv.blob.net, 2009:/dev_0001/printdata/pdl0001/6-10</id>
    <title>Update: 20091018</title>
    <updated>2009-10-18T12:34:00+09:00</updated>
    <link rel="alternate"
    type="text/html"
    href="http://print-sv.blob.net/dev_0001/printdata/pdl0001_6-10/readme.html" />
    <content type="application/X-iradv"
     src="http://print-sv.blob.net/dev_0001/printdata/pdl0001_6-10.zip" />
  </entry>
</feed>
```

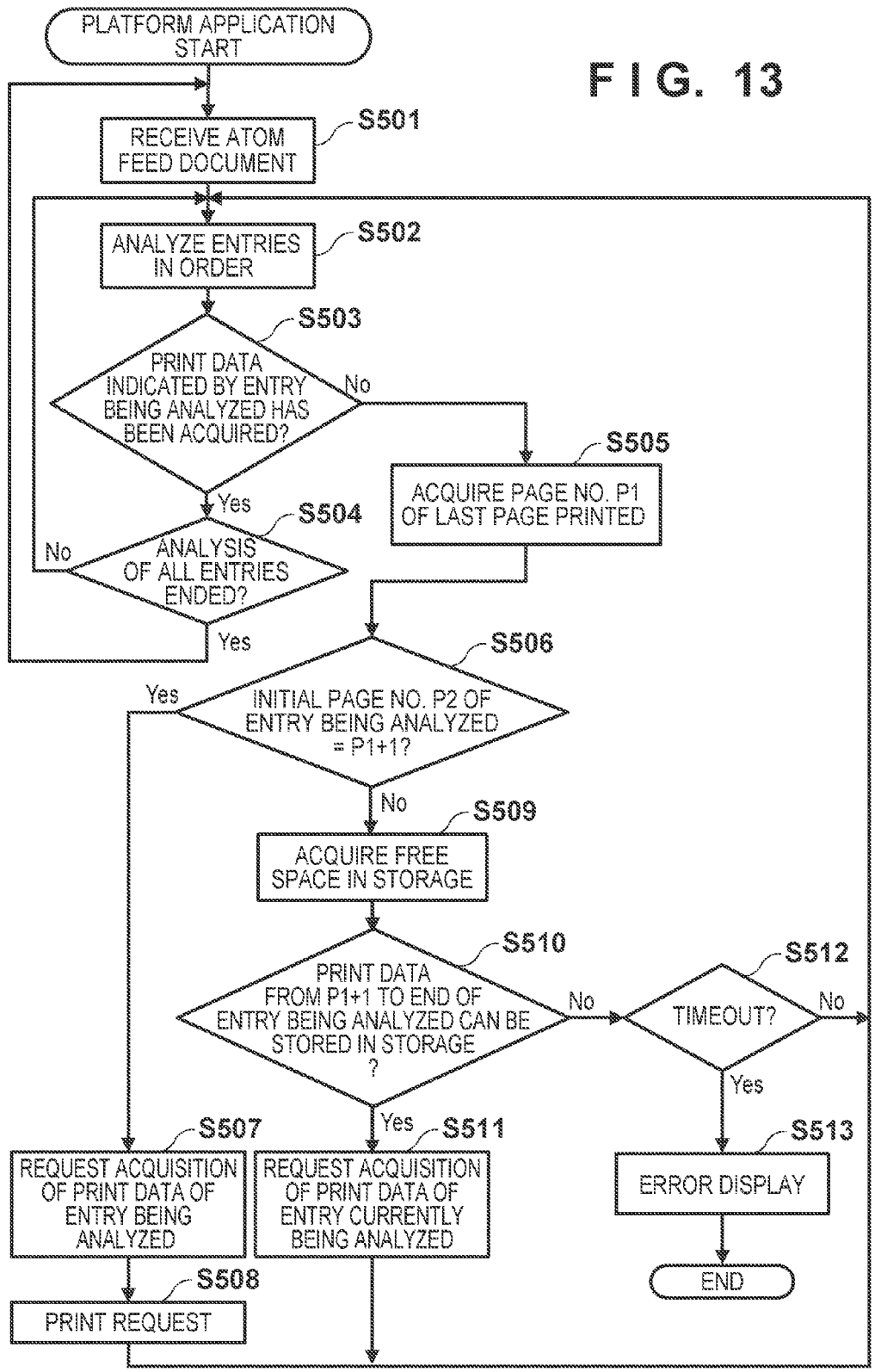

PRINTING SYSTEM, PRINTING APPARATUS, CONTROL METHOD AND PROGRAM

BACKGROUND OF THE INVENTION

1. Field of the Invention

The present invention relates to a printing system, a printing apparatus, a control method and a program.

2. Description of the Related Art

There are conventional printing systems utilizing RSS that implement a method in which a job management apparatus distributes a job information list to a plurality of output apparatuses, each output apparatus determines a job relating to itself from the job information list and transmits a transmission request for the job, and the job management apparatus transmits the job in accordance with the job transmission requests from the output apparatuses (e.g., see Japanese Patent Laid-Open No. 2008-097580).

Also, there are printing systems that employ a so-called cloud server on the Internet as a job management apparatus, and that generate print data accompanying a job using a cloud application which runs on the cloud server and provide the generated print data to a client.

SUMMARY OF THE INVENTION

In order solve the above problems, a printing system according to the present invention comprising a server apparatus and a printing apparatus connected to the server apparatus via a network, comprises:

a plurality of print data generation units provided in the server apparatus and configured to share content serving as print source data in accordance with an instruction transmitted from outside of the server apparatus via the network, and generate print data asynchronously and in parallel;

a storage unit provided in the server apparatus and configured to store print data generated by each of the plurality of print data generation units in a storage of the server apparatus in the generated order;

an inquiry unit provided in the printing apparatus and configured to periodically inquire whether print data is stored in the storage of the server apparatus;

a document generation unit provided in the server apparatus and configured, when there is an inquiry by the inquiry unit, and print data generated by any of the plurality of print data generation units is stored in the storage of the server apparatus, to generate a document including a storage location of the print data;

an analysis unit provided in the printing apparatus and configured to receive the document generated by the document generation unit from the server apparatus, and analyze information contained in the document; and a print control unit provided in the printing apparatus and configured, when a first page number of the print data analyzed by the analysis unit and a last page number of print data already acquired by the printing apparatus are continuous, to acquire the print data from the storage location analyzed by the analysis unit and print the acquired print data.

The present invention enables printing to be performed in accordance with a designated order, regardless of differences in the timing of print data generation, in the case where print data generation is performed asynchronously and in parallel with different resources.

Further features of the present invention will become apparent from the following description of exemplary embodiments with reference to the attached drawings.

BRIEF DESCRIPTION OF THE DRAWINGS

FIGS. 5A, 5B and 5C show examples of queue messages.

FIGS. 6A and 6B show examples of a queue management table 600 and a processing confirmation table 610.

FIG. 7 is a flowchart of a printing procedure using the printing system.

FIG. 11 shows an example Atom feed document output as a result of S404.

FIG. 12 shows an example Atom feed document output as a result of S404.

FIG. 13 is a flowchart showing Atom feed document and print data acquisition by a platform application 303.

DESCRIPTION OF THE EMBODIMENTS

With cloud applications, the processing time may differ from resource-to-resource (from page-to-page), when different resources are used collectively to generate a single document. For example, it is conceivable that, when printing a 10-page document, print data is generated in the order of pages 3-4, pages 1-2, and pages 5-10.

Also, in the case of processing a document with a plurality of print data processing engines (e.g., Windows (registered trademark) Azure Worker Role), a print output may be created asynchronously, resulting from differences in stall times, processing speeds and the like of the individual print data processing engines. In this case, there is a problem in that the printer is unable to efficiently print all of the pages for one document in order.

Hereinafter, preferred embodiments of the present invention for resolving the above problems will be described in detail based on the attached drawings. Firstly, definitions of the terms used in the embodiments of the present invention will be given.

Polling is processing that allows a client to inquire the processing status of a host at periodic intervals, in order for the client to confirm the progress or completion of processing requested of the host.

Print data processing refers to processing for converting content serving as print source data to data that a user can print with a printing apparatus such as an MFP (Multi-function peripheral) or a printer.

Content refers to electronic data that combines document data and image data, for example.

Content ID refers to unique information allocated for each content in order to uniquely determine content, for example. In this case, content IDs differ for different content.

Print data is data obtained by converting content using print data processing, examples of which include PDL (Page Description Language), PDF (Portable Document Format), and raster images.

Identification information is unique information allocated for each device in order to uniquely determine a device. Identification information differs for different devices. Note that a printing apparatus is given as an example of a device in the embodiments of the present invention. Identification information is, however, not limited thereto.

Embodiment 1

Figure 1:
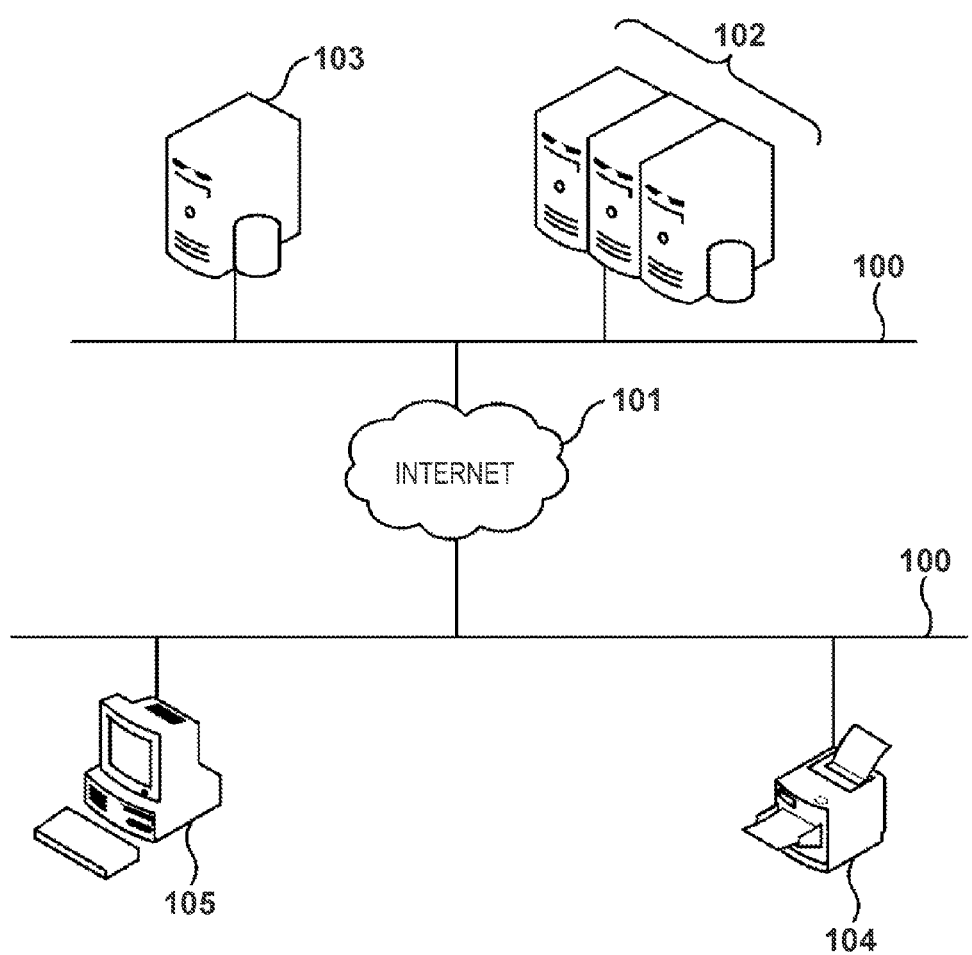
FIG. 1 shows a configuration of devices and a network constituting a printing system.

Overall Configuration (FIG. 1)

Apparatuses constituting a printing system for Embodiment 1 will be described in detail with reference to FIG. 1. FIG. 1 shows the apparatuses constituting the printing system connected via a network 100. The apparatuses constituting the printing system are a server computer group 102, a document server 103, a printing apparatus 104 and a client computer 105.

The network 100 is a communication channel for exchanging information between the abovementioned apparatuses. The Internet 101 is a communication channel for exchanging information between the abovementioned apparatuses through a firewall. The network 100 to which the server computer group 102 and the document server 103 belong and the network 100 to which the printing apparatus 104 and the client computer 105 belong are able to communicate though the firewall using the Internet 101. The network 100 and the Internet 101 are communication networks supporting TCP/IP protocols and the like, for example, and may be either wired or wireless. In FIG. 1 of Embodiment 1, the server computer group 102, while shown as being a single server, is constituted by a plurality of server computers.

Figure 2A:
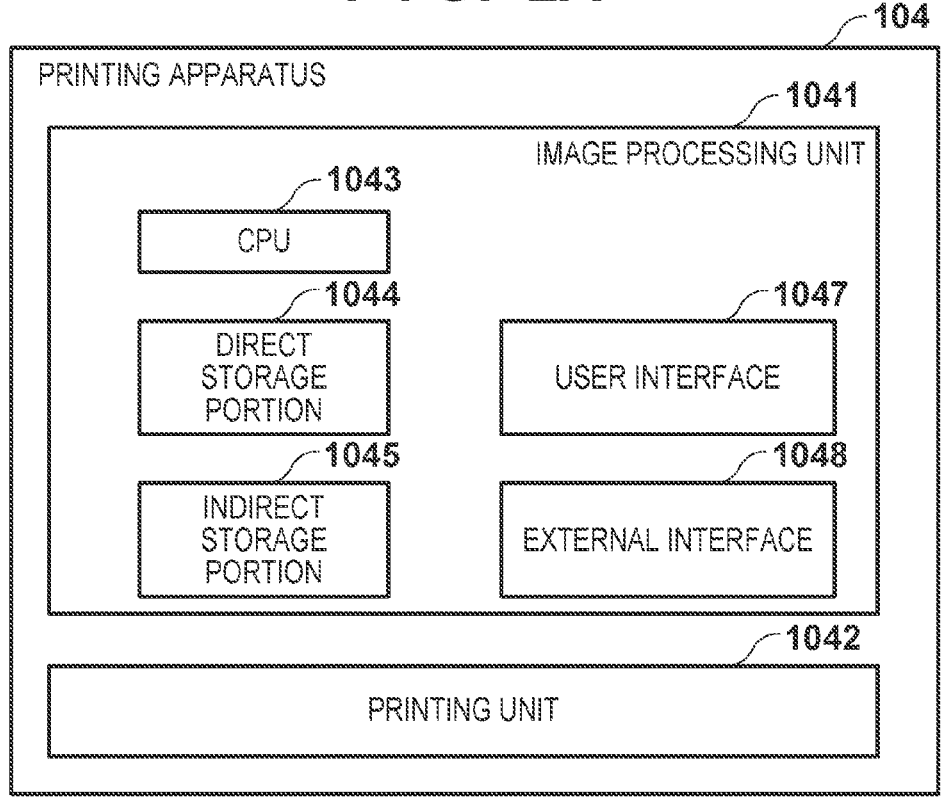
FIGS. 2A and 2B show internal configurations of a printing apparatus 104 and a client computer 105.
Figure 2B:
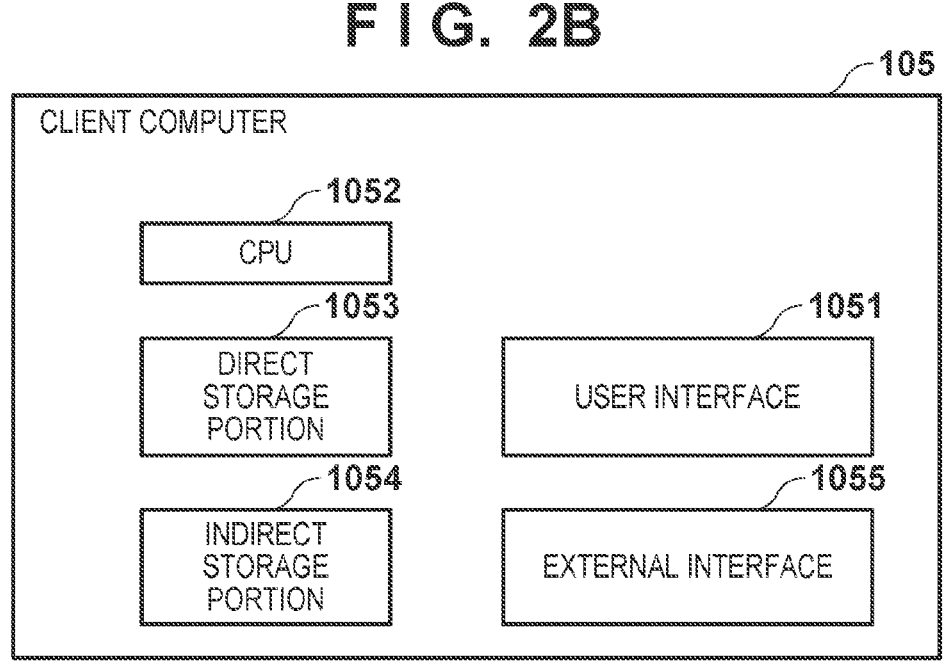

Internal Configuration of Apparatuses (FIGS. 2A, 2B)

Next, the internal configuration of the apparatuses constituting the printing system of FIG. 1 will be described in detail.

Internal Configuration of Printing Apparatus (FIG. 2A)

Firstly, the internal configuration of the printing apparatus 104 will be described using FIG. 2A. FIG. 2A is a block diagram illustrating the internal configuration of the printing apparatus 104.

The printing apparatus 104 is constituted by an image processing unit 1041 and a printing unit 1042. The image processing unit 1041 is constituted by a CPU 1043, a direct storage portion 1044, an indirect storage portion 1045, a user interface 1047, and an external interface 1048.

The CPU 1043 is a unit that executes prescribed programs and instructs various controls of the printing apparatus 104. The CPU 1043 is realized by a CPU (Central Processing Unit). The direct storage portion 1044 is a work memory that is used when the CPU 1043 executes a program, with the program to be executed by the CPU 1043 being loaded into the direct storage portion 1044. The direct storage portion 1044 is realized by a RAM (Random Access Memory). The indirect storage portion 1045 stores various types of programs including an application program and a platform program. A program stored in the indirect storage portion 1045 moves to the direct storage portion 1044 when the CPU 1043 executes the program. The indirect storage portion 1045 is realized by a SSD (Solid State Drive) or an HDD (Hard Disk Drive). Note that the CPU 1043 may be a multiprocessor.

Here, a platform will be described in detail. A platform is a substrate that serves as the execution environment of an application, and is realized by a platform program. Apart from being able to execute new applications independently developed by a user, realizing a platform enables the operation screen of the printing apparatus 104 to be customized.

The method for realizing a platform will be described. The CPU 1043 moves the platform program stored in the indirect storage portion 1045 to the direct storage portion 1044. The CPU 1043 is able to execute the platform program once the move is completed. In Embodiment 1 of the present invention, execution of the platform program by the CPU 1043 is termed launching a platform. Note that the platform is launched on firmware of the printing apparatus 104. The platform program provides an environment for executing object-oriented application programs. As an example, JRE (JAVA (registered trademark) Runtime Environment) is used as the platform program, in the case where an application is described with JAVA (registered trademark). Of course, this is merely an example, and other platforms can also be used.

A method of executing an application program on a platform will be described in detail. The platform launched when triggered by an application execution instruction moves the application program stored in the indirect storage portion 1045 to the direct storage portion 1044. The platform is able to execute the application program once the move is completed. The platform then executes the application program. The function of the platform that can be provided by thus executing the application program is called a platform application in Embodiment 1 of the present invention. Further, it is possible for the platform to perform part of the processing of the flowcharts disclosed in Embodiment 1 of the present invention. In Embodiment 1 of the present invention, printing software that accepts print requests operates as an application program on the platform. The printing software is able to receive print data using a communication protocol such as HTTP (Hyper Text Transfer Protocol), for example, from a device connected via the network. The printing software transfers received print data to the firmware, and the firmware, having received the print data, starts print data processing. Note that if print data can be printing without processing, the firmware omits the print data processing. Control of the printing apparatus 104 can thus be realized by executing an application program with the platform. Note that firmware is a program that is integrally provided with hardware, and here refers to a program that is preinstalled in the printing apparatus and provides a predetermined function with respect to an application.

The user interface 1047 is a unit required in order to accept processing requests from a user. For example, the user interface 1047 accepts signals that depend on instructions input by a user via a keyboard, a mouse or the like. The external interface 1048 is capable of receiving data from an external apparatus and transmitting data to an external apparatus. External apparatuses include, for example, an external storage device such as an external HDD or an external USB memory, or a separate apparatus such as a separate host computer or printing apparatus connected via a network. The printing apparatus 104 is capable of communicating with the client computer 105, the server computer group 102 and the like via the network 100 and the Internet 101.

Internal Configuration of Client Computer (FIG. 2B)

Secondly, the internal configuration of the client computer 105 will be described using FIG. 2B. FIG. 2B is a block diagram illustrating an internal configuration of the client computer 105. The client computer 105 is constituted by a user interface 1051, a CPU 1052, a direct storage portion 1053, an indirect storage portion 1054, and an external interface 1055.

The user interface 1051 is a unit required in order to accept processing requests from a user. For example, the user interface 1051 accepts signals that depend on instructions input by a user via a keyboard, a mouse or the like.

The CPU 1052 is a unit that executes prescribed programs and instructs various controls of the client computer 105. The CPU 1052 is realized by a CPU. The direct storage portion 1053 is a work memory used when the CPU 1052 executes a program, with the program to be executed by the CPU 1052 being loaded into the direct storage portion 1053. The direct storage portion 1053 is constituted by a RAM. The indirect storage portion 1054 stores various types of programs including an application program and an OS (Operating System). A program stored in the indirect storage portion 1054 moves to the direct storage portion 1053 when the CPU 1052 executes the program. The indirect storage portion 1054 is constituted by a ROM or an HDD. The external interface 1055 is connected to the network 100, and is capable of communicating with other apparatus connected to the network 100. Note that although there are differences in size, performance, execution programs and the like, the server also has a HW configuration such as FIG. 2B.

Figure 3:
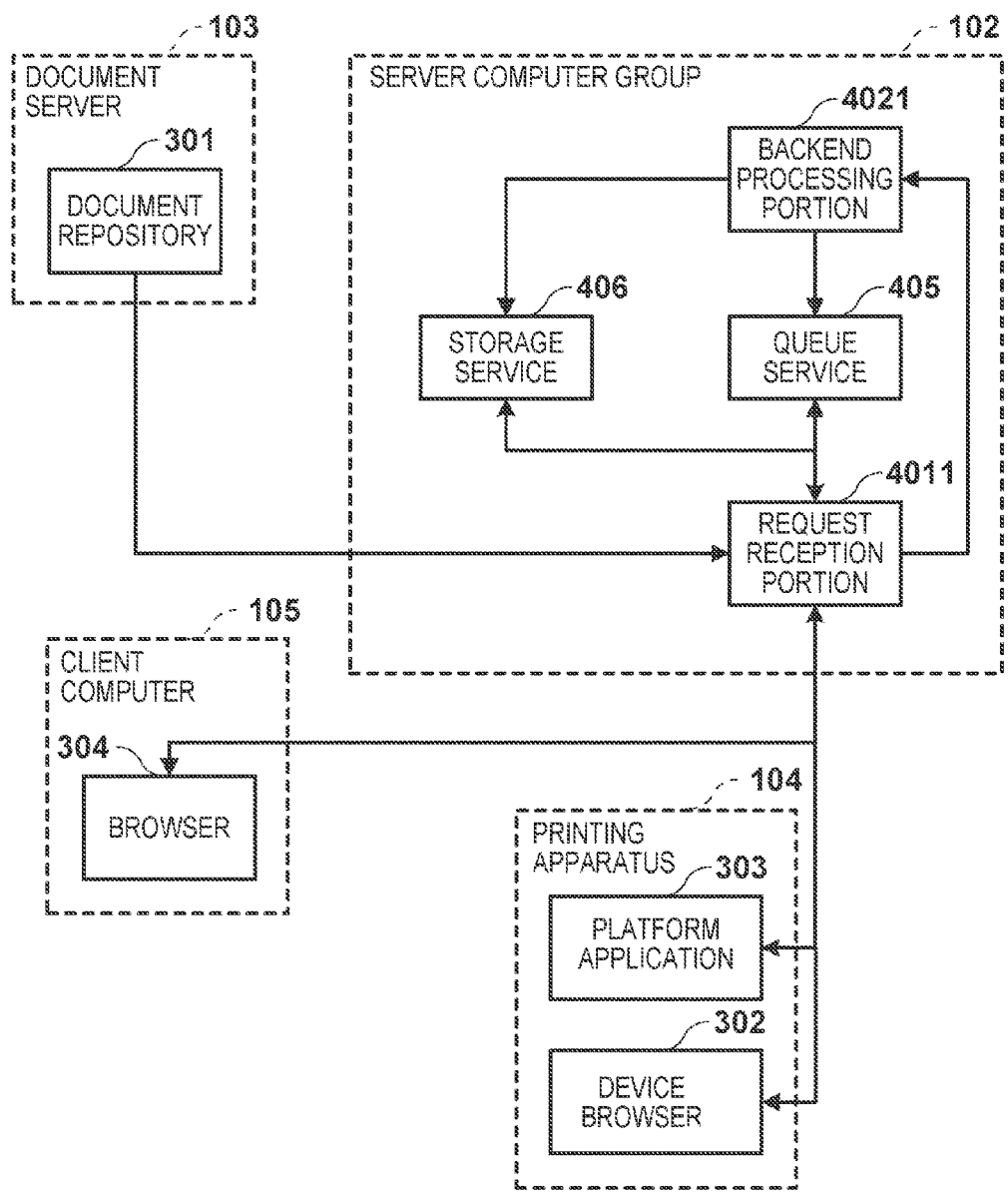
FIG. 3 is a functional block diagram of the devices in the printing system.

Functional Configuration of Apparatuses (FIG. 3)

Next, the functions of the apparatuses in the printing system of Embodiment 1 will be described in detail with reference to FIG. 3. FIG. 3 is a functional block diagram of the apparatuses in the printing system.

Firstly, the functions of the server computer group 102 will be described. The server computer group 102 has the functions of a request reception portion 4011, a backend processing portion 4021, a queue service 405, and a storage service 406. In Embodiment 1 of the present invention, there is at least one server computer having the request reception portion 4011. There is at least one server computer having the backend processing portion 4021. There is also at least one server computer having the functions of both the queue service 405 and the storage service 406. These function-specific units are realized by programs executed by the server computers.

The request reception portion 4011 has a function of accepting a processing request sent from the client computer 105 or the printing apparatus 104. The backend processing portion 4021 has a function of performing processing in relation to a processing request using a processing program. Specifically, the backend processing portion 4021 performs processing after loading a processing program into the memory of the server computer executing the backend processing portion 4021. The request reception portion 4011 and the backend processing portion 4021 are realized as a result of a request reception program or a backend processing program saved in the indirect storage portion 1054 of FIG. 2B being loaded into the direct storage portion 1053 and executed by the CPU 1052.

The queue service 405 has the following functions. Firstly, the queue service 405 has a function that allows the request reception portion 4011 and the backend processing portion 4021 to perform asynchronous data communication. Secondly, the queue service 405 has a function of making a queue message added to a queue visible or invisible.

The first function will be described. The request reception portion 4011 and the backend processing portion 4021 communicate with the following method. Firstly, the request reception portion 4011, having received a processing request from a user, creates a ticket called a queue message that depends on the processing request from the user. At this time, a request ID corresponding to the queue message is also created. Note that the queue message and request ID will be discussed below. The queue message is stored in a queue by the request reception portion 4011. The backend processing portion 4021 acquires the queue message from the queue. The backend processing portion 4021 acquires the queue message and processes the processing request from the user with reference to the queue message. The processing request from the user is thereby resolved. The request reception portion 4011 and the backend processing portion 4021 are thus capable of communicating asynchronously by using the queue service 405. A more detailed description of the first function and a description of the second function will be given later. Note that the queue service 405 is realized as a result of a queue service program saved in the indirect storage portion 1054 of FIG. 2B being loaded into the direct storage portion 1053 and executed by the CPU 1052. Also, the queue is realized by the indirect storage portion 1054.

The storage service 406 has a function of saving various types of data including data resulting from execution of processing by the backend processing portion 4021. The storage service 406 is realized by the indirect storage portion 1054 of FIG. 2B. The functions of the server computer group 102 are as described above, with a more detailed description being given later.

Next, the function of the document server 103 will be described. The document server 103 has a function of a document repository 301. The document repository 301 is realized by the indirect storage portion 1054 of FIG. 2B. For example, the document repository 301 saves content that a user has instructed for printing from the client computer 105 or the printing apparatus 104. The following content is also saved in the document repository 301 in addition to pre-saved content.

The content referred to here is content that the user creates with an application on the server computer group 102 via a browser 304 that is mentioned later. Even content thereby created using an application on the server computer group 102 can be easily printed without installing the application on the client computer 105. Note that the abovementioned application on the server computer group 102 refers to various applications such as a document creation application, an image creation application and a form management application. These applications are held in the indirect storage portion 1054 of FIG. 2B, and loaded into the direct storage portion 1053 when execution is instructed and executed by the CPU 1052.

Next, the printing apparatus 104 will be described in detail. The printing apparatus 104 has functions of a device browser 302 and a platform application 303. The device browser 302 has a function of enabling the user to view data and information saved in a device connected via the network 100. The device browser 302 is realized as a result of a device browser program saved in the direct storage portion 1044 of FIG. 2A being loaded into the indirect storage portion 1045 and executed by the CPU 1043. Also, the user is able to issue a content print instruction using the device browser 302. The device browser 302 is a Web browser that interprets data described with HTML data and displays an operation screen for accepting instructions from the user.

The platform application 303 has a function of providing various services. The platform application 303 is realized by an application program that operates on the platform. In Embodiment 1 of the present invention, the platform application 303 provides a printing software service. Also, the platform application 303 has a function of an Atom (or RSS) feed reader, and a function of polling a specified URL and referencing an Atom feed document (or RSS document). As mentioned above, this service is able to transmit received print data to the firmware. Also, this service confirms with the request reception portion 4011 whether generation of print data is finished using Atom (or the RSS protocol). At this time, the service performs generation confirmation on the basis of an Atom feed document (or RSS document) created by the request reception portion 4011 (document generation unit).

Finally, the client computer 105 will be described in detail. The client computer 105 has the function of the browser 304.

The browser 304 has a function of enabling a user to view data and information saved in a device connected via the network 100. The browser 304 is realized as a result of a browser program saved in the indirect storage portion 1054 of FIG. 2B being loaded to the direct storage portion 1053 and executed by the CPU 1052. The browser 304 is, for example, a Web browser. The functions of the apparatuses in the printing system of Embodiment 1 are as described above.

Figure 4:
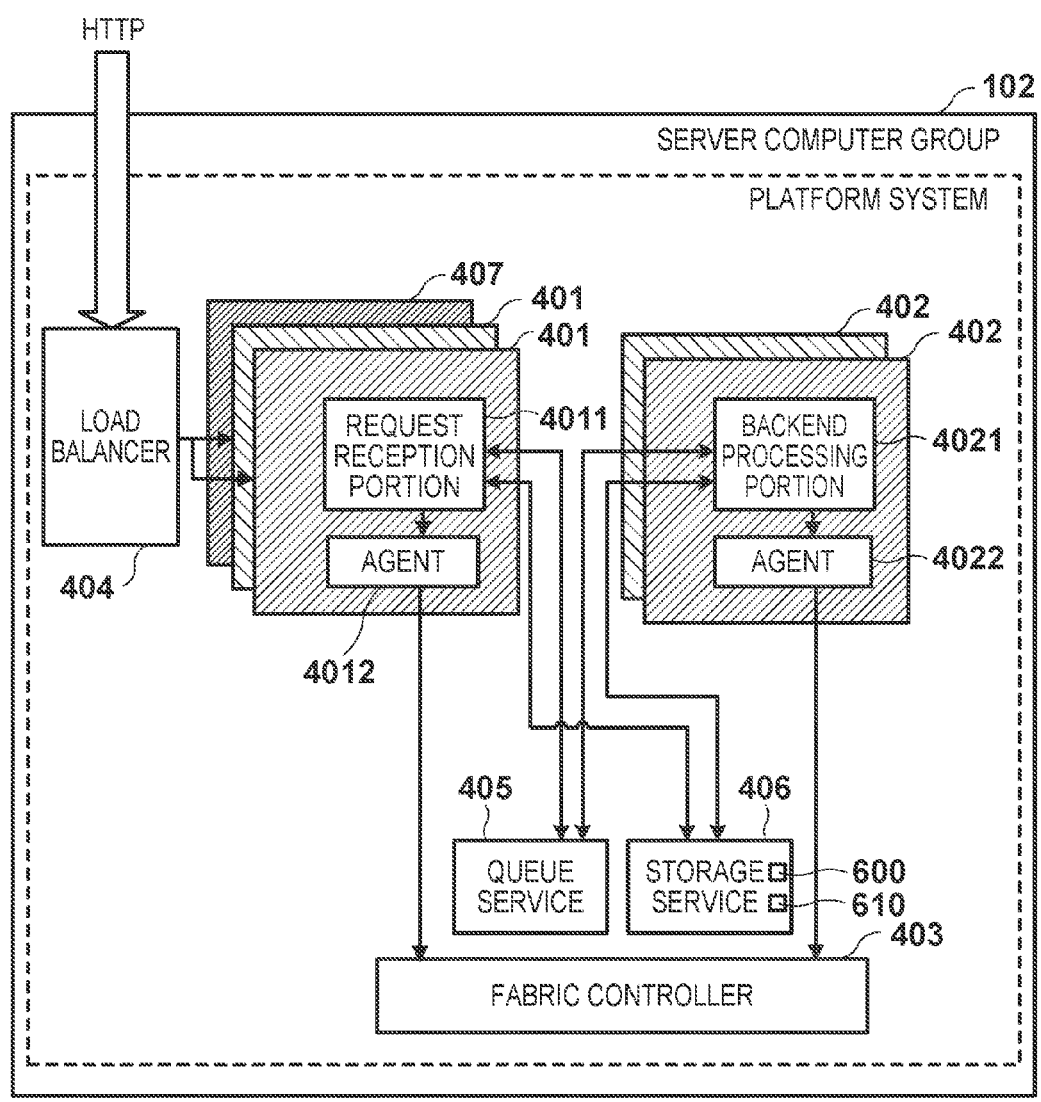
FIG. 4 shows a platform system of a server computer group 102.

Platform System (FIG. 4)

Next, the platform system of the server computer group 102 will be described in detail with reference to FIG. 4. FIG. 4 is a diagram showing the various functions of the server computer group 102. In FIG. 4, the physical hardware resources in the server computer group 102 are used in the platform system of the server computer group 102. The user of the platform system of the server computer group 102 is able to use the physical hardware resources in the server computer group 102 as computing resources.

The platform system (operating system) of the server computer group 102 has the following functions: virtual machines 401 and 402, a fabric controller 403, a load balancer 404, the queue service (queue) 405, the storage service (storage) 406, and a management virtual machine 407.

The platform system operating on the server computer group 102 has a plurality of each of the virtual machines 401 and 402. The virtual machines are logical computers obtained by dividing the physical server computer group 102 into logical computers using virtualization technology, and that each operate with an operating system that is independent from the other logical computers. The logical computers are counted as instances. In Embodiment 1 of the present invention, one instance, or in other words, one virtual computer operates on one server computer in the server computer group 102.

The virtual machine 401 is constituted by the request reception portion (Web role instance) 4011 and a request reception portion agent (agent) 4012. The request reception portion 4011 receives a processing request from the user via the later-mentioned load balancer 404. Also, the request reception portion 4011 transmits a processing request to the backend processing portion 4021 via the queue service 405.

In order to secure a high availability of the request reception portion 4011, requests from an external network (here, communication using HTTP) is made through the load balancer 404, which is outside of the virtual machine 401. The load balancer 404 manages requests from an external network in an integrated fashion, and selectively transfers the requests to a plurality of virtual machines having equivalent functions of a request reception portion. The request reception portion agent 4012 collects various information including the use status of the virtual machine 401, the operating state of the request reception portion 4011, the use status of resources of the virtual machine 401, and errors of the request reception portion 4011, and periodically transfers the collected information to the fabric controller 403.

The instances of the request reception portion 4011 and the backend processing portion 4021 are managed by the fabric controller 403. Thus, the extensibility and availability of the instances are guaranteed. For example, assume that a certain specific instance of the request reception portion 4011 or the backend processing portion 4021 is shut down due to a server error. In this case, the fabric controller 403 no longer receives periodic notifications from the request reception portion agent 4012 or a backend reception portion agent 4022. The fabric controller 403 that is no longer receiving periodic notifications issues an instruction to a virtual machine such that processing allocated to the instance that has shut down is assigned to a new instance. This enables processing delays to be suppressed, since the number of instances executing processing is kept constant.

The virtual machine 402 is constituted by the backend processing portion (worker role instance) 4021 and the backend processing portion agent (agent) 4022. The backend processing portion 4021 receives processing requests from the request reception portion 4011 via the queue service 405. The backend processing portion 4021 executes processing requests received from the request reception portion 4011 via the queue service 405. Also, the backend processing portion 4021 is scaled out. Scaling out refers to increasing the number of virtual machines 402, and increasing the number of instances of the backend processing portion 4021. The amount of data processing per backend processing portion decreases when the number of instances of the backend processing portion 4021 increases. Results in relation to a processing request from the user can thereby be returned more quickly.

The queue service 405 provides a service for the request reception portion 4011 and the backend processing portion 4021 to perform asynchronous data communication. Data communication is performed asynchronously as a result of the request reception portion 4011 and the backend processing portion 4021 issuing various instructions to the queue service 405. This will be described in detail. The request reception portion 4011 instructs the queue service 405 to add queue messages to the queue. The backend processing portion 4021 instructs the queue service 405 to acquire queue messages from the queue and to delete queue messages.

The series of operations that allow the request reception portion 4011 and the backend processing portion 4021 to perform data communication asynchronously will be described. The request reception portion 4011 creates a queue message that depends on the processing request from the user, and transmits an addition instruction to the queue service 405 so as to add the queue message to the queue. The queue service 405, having received the addition instruction, adds the queue message to the queue.

At this time, even if the processing request from the user relates to one document, the request reception portion 4011 adds a plurality of queue messages corresponding to the amount of content if the document includes a plurality of content. This applies, for example, to a hypertext document that includes external links, such as a 10-page document of which pages 3-5 are an external link.

The backend processing portion 4021 issues an acquisition instruction to the queue service 405, in order to acquire a queue message. The queue service 405, having received the acquisition instruction, returns a queue message, a queue ID uniquely allocated for each queue message and a request ID to the backend processing portion 4021 in response to the acquisition instruction. A queue ID is unique information allocated for each queue message in order to uniquely determine a queue message. The request ID is used when the backend processing portion 4021, having finished processing, issues a deletion instruction to delete the queue message. The queue message, queue ID and request ID are saved in association with each other. Note that in the present embodiment, acquisition of a queue message does not result in the queue message being deleted from the queue. A deletion instruction needs to be additionally issued in order to delete the queue message.

The backend processing portion 4021, on completing processing in relation to the processing request, issues a deletion instruction to the queue service 405 to delete the queue message corresponding to the request ID. The queue service 405, having received the deletion instruction, deletes the queue message corresponding to the request ID instructed by the backend processing portion 4021 from the queue.

Also, the queue service 405 has a function of making a queue message that has been added to the queue visible or invisible. Making a queue message invisible refers to the queue service 405 not passing the queue message to a backend processing portion 4021, in the case where the backend processing portion 4021 requests acquisition of the queue message that has been added to the queue. Once a backend processing portion 4021 has acquired a queue message from the queue, the acquired queue message is made invisible by the queue service 405. Making a queue message visible refers to the queue service 405 passing the queue message to the backend processing portion 4021, in the case where the backend processing portion 4021 requests acquisition of a queue message that has been added to the queue. A queue message that is made invisible after being acquired by the backend processing portion 4021 is made visible by the queue service 405 if a processing result is not returned from the backend processing portion 4021 that is performing the processing in a given period of time. Redundant processing due to backend processing portions 4021 other than the backend processing portion 4021 that initially requested acquisition redundantly processing the same queue message can thereby be avoided.

The storage service 406 provides storage that is used for saving data, and provides a function of saving sets of binary data. The storage service 406 also provides a function of holding a later-mentioned processing confirmation table 610 and queue management table 600.

The management virtual machine 407 is constituted by a request reception portion 4011 and a request reception portion agent 4012. A difference from the virtual machine 401 lies in the fact that the virtual machine has an instance of the request reception portion 4011 that only a management user can use. The management user is able to operate the queue management table 600 using the request reception portion 4011 of this virtual machine.

Example Queue Messages (FIGS. 5A, 5B, 5C)

Next, a queue message in Embodiment 1 of the present invention will be described. FIGS. 5A, 5B and 5C show examples of queue messages. A queue message describes the details of processing that the request reception portion 4011 requests of the backend processing portion 4021.

Reference numeral 501 indicates the location of the queue to which the queue message is added. Reference numeral 502 indicates a timeout period. VisibilityTimeout=30 of reference numeral 502 denotes the following: if there is no response from the backend processing portion 4021 that acquired the queue message after 30 seconds has elapsed since the backend processing portion 4021 acquired the queue message, the queue service 405 will change the queue message from invisible to visible. Messagettl=3600 of reference numeral 503 denotes the following: if the backend processing portion 4021 has not issued a queue message deletion instruction after 3600 seconds has elapsed, the queue service 405 will delete that queue message even if the queue message has not been processed by the backend processing portion 4021. Reference numeral 504 denotes the date on which the queue message was created.

Next, the message data content section of a queue message will be described. The message data content section is determined according to a processing request from the user. Reference numeral 505 indicates the request ID. In the case of FIGS. 5A, 5B and 5C, the request IDs are respectively 0001, 0002 and 0003. A request ID is unique information created according to the processing request from the user. Reference numeral 506 indicates the content ID. In the case of FIGS. 5A, 5B and 5C, the content ID is d_00001. Reference numeral 507 indicates the storage location of content saved in the document repository 301. Reference numeral 508 is a URL indicating an Atom feed document which will be specifically shown in later-mentioned FIGS. 11 and 12, and indicates the output destination of print data generated as a result of the present embodiment.

Tables (FIGS. 6A, 6B)

Next, the various tables will be described with reference to FIGS. 6A and 6B. These tables are stored in the storage service 406, and are accessible from both the backend processing portion 4021 and the request reception portion 4011.

Queue Management Table (FIG. 6A)

The queue management table 600 will be described with reference to FIG. 6A. Reference numeral 601 indicates a queue ID (Queue ID) and denotes unique information of a queue. Reference numeral 602 indicates a device ID (Device ID) and denotes identification information for identifying a device. In Embodiment 1 of the present invention, queue IDs are in one-to-one correspondence with device IDs. That is, one queue is allocated to each printing apparatus. Reference numeral 603 indicates a device model (Device Model). Printing apparatuses classified as being the same type will have device models 603 of the same value. Reference numeral 604 indicates the maximum number of instances (Number of Instances), and denotes the maximum practical number of instances set for each queue ID. This will be described in detail.

As described above, a plurality of backend processing portions 4021 operate on a plurality of virtual machines, and the number of instances of these virtual machines can increased by using a technique called "scaling out". However, the load on the server computer group 102 increases if scaling out is excessive. In view of this, the number of instances of the backend processing portion 4021 is determined in accordance with the device. Processing compatible with the capability of the device is thereby performed.

Reference numeral 605 indicates a standard value (Queue Length) for the number of queue messages, and denotes a standard value for the number of queue messages stored in a queue. In the case where the number of queue messages stored in the queue exceeds the standard value 605, the request reception portion 4011 judges whether to instruct scaling out. This is because if the number of queue messages stored in the queue exceeds the standard value 605, it means that the processing of the backend processing portion 4021 is delayed. Note that in Embodiment 1 of the present invention, the number of queue messages stored in a queue is represented by length.

Here, setting of the queue management table 600 will be described in detail. The manager of the printing system accesses a management request reception portion 4011 from the client computer 105. The manager inputs manager information and performs authentication. The request reception portion 4011 transmits a management operation screen to the client computer 105 in response to the manager information being legitimate. The manager configures the settings of the queue management table 600 using the abovementioned operation screen. The request reception portion 4011 of the management virtual machine 407 updates the queue management table 600 on the basis of the information set by the manager.

Here, an example of setting the queue management table 600 performed by the management user will be shown. For example, the number of instances is set to a low value in a printing apparatus having a low printing speed. This is because even if a processing request to a printing apparatus having a low printing speed is processed quickly, the print data builds up in storage since the printing speed is slow. The storage of the server computer group 102 could possibly be constrained as a result.

Also, as an example of other settings of the queue table, the management user sets the queue length to a low value in a printing apparatus having fast printing speed. This is because a printing apparatus having fast printing speed is able to process a large amount of print data due to performing fast printing. Hence, it is advantageous for a queue message added to a queue corresponding to a printing apparatus having fast printing speed to be processed by the backend processing portion 4021 having a large number of instances. Setting the queue length to a low value enables the timing of the judgment as to whether to perform scaling out by the request reception portion 4011 to be brought forward. This enables the speed of print processing by the printing system to be increased.

Processing Confirmation Table (FIG. 6B)

Next, the processing confirmation table 610 will be described with reference to FIG. 6B. The processing confirmation table 610 is used in order to confirm whether a processing request has been completed. Reference numeral 606 indicates a request ID (Request ID). Reference numeral 607 indicates a content ID (Document ID). Reference numeral 608 indicates a print data storage location (result_storedURI), and denotes the location where the results of processing by the backend processing portion 4021 are stored.

Here, an example of a method for confirming whether a processing request has been completed will be described below. The platform application 303 of the printing apparatus 104 performs confirmation. When a processing request has been made to the request reception portion 4011, this platform application 303 receives a request ID 606 corresponding to the processing request from the request reception portion 4011. The platform application 303 inquires the request reception portion 4011 by polling whether processing corresponding to the request ID has ended. The request reception portion 4011, having received the inquiry, confirms the request ID 606 in the processing confirmation table 610 saved in the storage provided by the storage service 406. Specifically, the request reception portion 4011 being inquired confirms whether the storage location is described in the field of the print data storage location 608 corresponding to the request ID 606 being inquired. If described, the request reception portion 4011 transmits the storage location to the platform application 303 that is confirming the processing result. If not described, the request reception portion 4011 informs the platform application 303 that processing has not ended. The platform application 303 is thereby able to confirm the processing result.

Note that entries to the processing confirmation table 610 are added at the following two times. When instructing the queue service 405 to add a queue message, the request reception portion 4011 newly adds a request ID 606 and a content ID 607 to the processing confirmation table 610 that is saved in the storage provided by the storage service 406. As an example, the request ID 606 is 0001 and the content ID 607 is d_00001, as shown in FIG. 6B. The backend processing portion 4021, having finished processing the processing request, adds the storage location to the field of the print data storage location 608 corresponding to the processed request ID 606. As an example, http://print-sv.blob.net/dev_0001/atom.xml is added to the field of the print data storage location 608.

Printing Procedure of Printing System (FIG. 7)

Next, a printing procedure using the printing system in Embodiment 1 of the present invention will be described in detail with reference to FIG. 7. FIG. 7 shows the flow of processing performed by the printing system in Embodiment 1 of the present invention. Also, the backend processing portion 4021 of Embodiment 1 of the present invention performs print data processing. Note that an example of the backend processing portion 4021 that performs print data processing is called a printing service.

Firstly, the user instructs a content print request using the device browser. The device browser transmits the content ID of the content for which the print request was received from the user and a device ID to the request reception portion 4011 as the print request (S101). In 5101, the request reception portion 4011 that transmitted the print request creates a queue message and a request ID for the print request, and transmits the created request ID to the device browser 302. Also, the request reception portion 4011 transmits the content ID received at 5101 to the document repository 301 as a content acquisition request (S102).

In S102, the device browser 302, having received the request ID, transmits the request ID to the platform application 303. Also, the request reception portion 4011 that requested the document repository 301 to acquire content acquires the content from the document repository 301 (S103).

After S103, the platform application 303 polls the request reception portion 4011 until it is confirmed that print data processing corresponding to the received request ID is completed. In 5103, the request reception portion 4011, having acquired the content, stores the content in the storage provided by the storage service 406 (S104).

In S104, the request reception portion 4011, having stored the content in the storage provided by the storage service 406, issues an addition instruction to the queue service 405 so as to add the queue message describing the storage location of the content to the queue (S105). Thereafter, the request ID and the content ID relating to the content currently being processed are added to the processing confirmation table 610. The printing service confirms by polling whether there is a queue message in the queue whose processing is handled by the printing service. In the case where a queue message has been added to the queue by the request reception portion 4011, the printing service issues an acquisition instruction to the queue service 405 to acquire the queue message (S106). In S106, the printing service, having issued the acquisition instruction and acquired the queue message, acquires content from the storage provided by the storage service 406 on the basis of the content storage location described in the queue message (S107).

In S107, the printing service, having acquired the content, executes print data processing for converting the acquired content to print data. At this time, the printing service executes the print data processing after loading a driver program into memory. The printing service, having executed the print data processing, stores the print data resulting from execution in the storage provided by the storage service 406 (S108). In S108, the printing service, having stored the print data, adds description to the processing confirmation table 610 such that the storage location of the print data is associated with the request ID. Note that the printing service is able to confirm, or in other words, read the request ID from the acquired queue message. The printing service issues a deletion instruction to the queue service 405 to delete the processed queue message (S109).

The platform application 303 confirms the storage location of the print data in the processing confirmation table 610 via the request reception portion 4011, on the basis of the request ID (S110). That is, the platform application 303 requests the storage service 406 for the storage location of the print data corresponding to the request ID, and obtains information indicating the storage location in response. In S110, the platform application 303, having confirmed the storage location of the print data, acquires print data from the storage provided by the storage service 406 (S111). In S111, the platform application 303, having acquired the print data, performs processing so as to enable the printing apparatus 104 to print the print data (S112). The printing procedure using the printing system in Embodiment 1 of the present invention is as described above.

Figure 8:
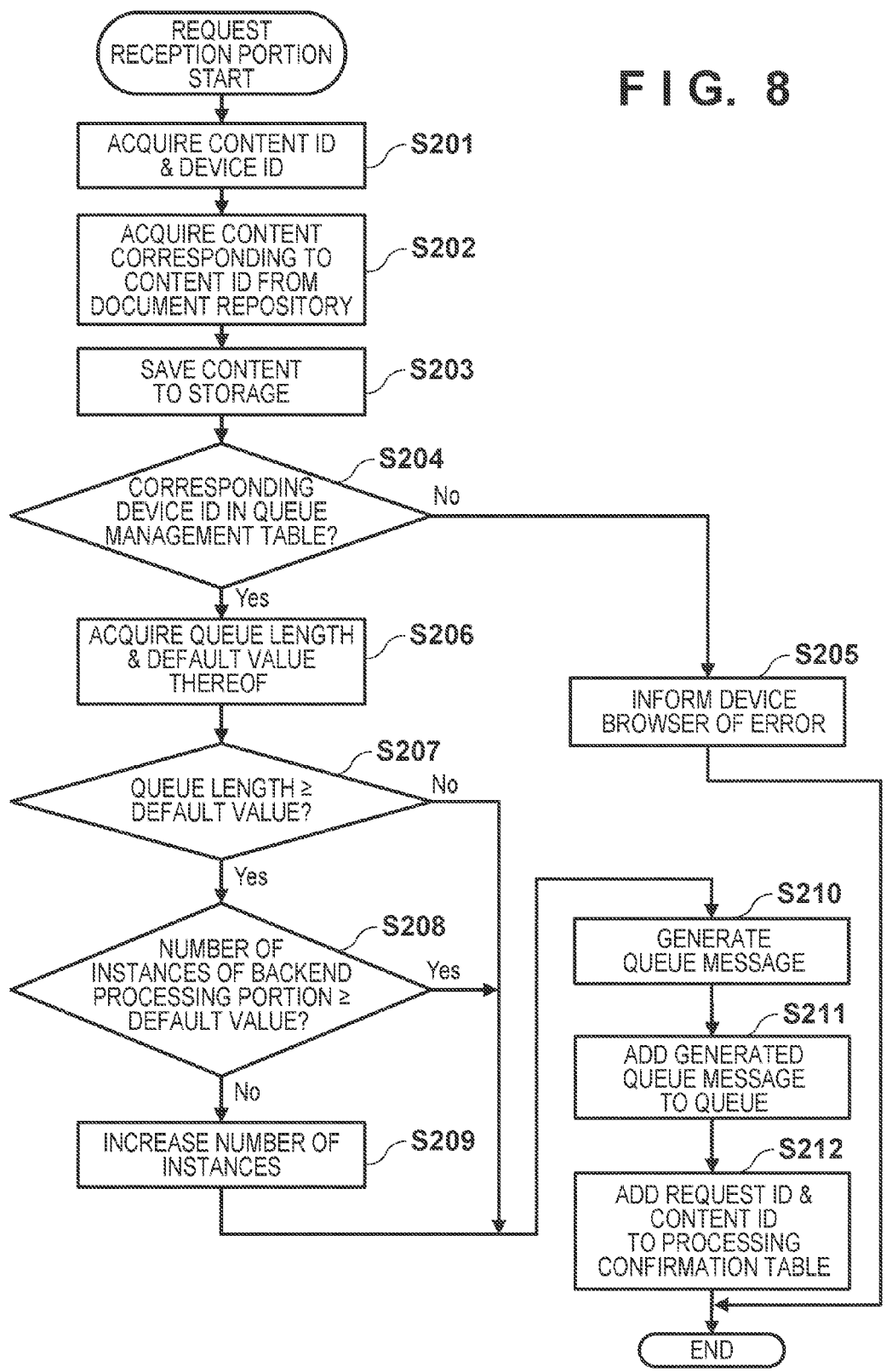
FIG. 8 is a flowchart of a print data generation procedure of a request reception unit 4011.
Figure 9:
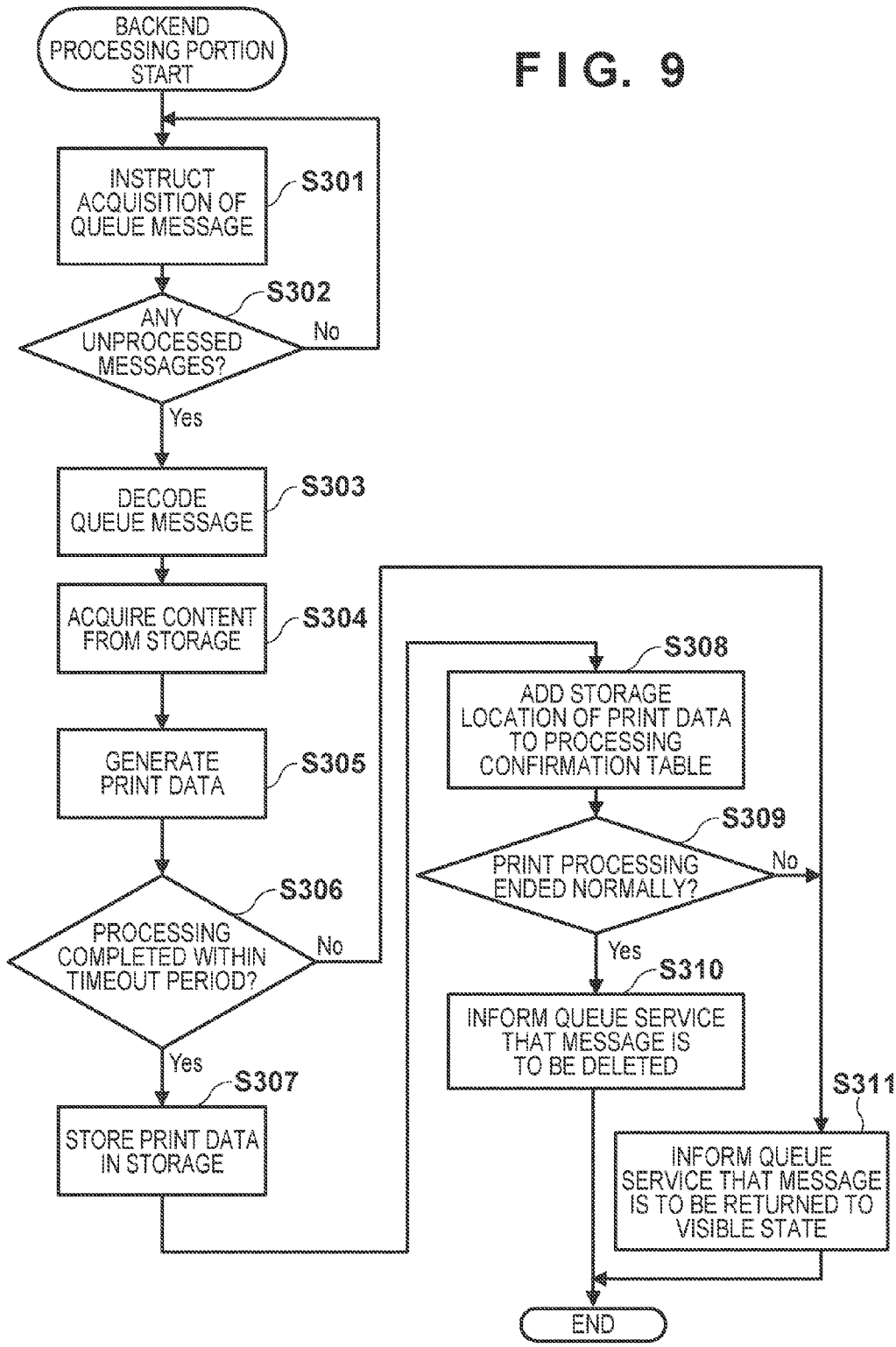
FIG. 9 is a flowchart of a print data generation procedure of a printing service.

Processing Procedure of Server Computer Group (FIGS. 8, 9)

Next, the operation of the server computer group 102 in Embodiment 1 of the present invention will be described in detail with reference to FIGS. 8 and 9. Note that a job refers to a processing request from a user, with a processing request in Embodiment 1 of the present invention being a print request. Also, the printing service that will be described here is the same as the printing service of FIG. 7.

Processing of Request Reception Unit (FIG. 8)

Firstly, the processing of the request reception portion 4011 will be described in detail with reference to FIG. 8. FIG. 8 shows in detail the processing procedure of the request reception portion 4011 shown in FIG. 7. The request reception portion receives a device ID and the content ID of the content that the user has requested for printing (S201).

The request reception portion, having received the content ID and device ID in S201, acquires the content corresponding to the content ID from the document repository (S202).

The request reception portion, having acquired the content in S202, saves the content to the storage (S203).

The request reception portion, having saved the content in S203, performs a search as to whether a device ID matching the device ID received at S201 exists in the queue management table 600 (S204). If the search result indicates that a matching device ID does not exist, the processing proceeds to S205. If the search result indicates that a matching device ID does exist, the processing proceeds to S206.

In S205, the request reception portion performs error processing. Error processing involves the request reception portion informing the device browser 302 that there is an error. The device browser 302, having being informed of the error, suspends processing. On the other hand, if error processing has been performed, the request reception portion stops the processing.

In S206, the request reception portion acquires the length of the queue corresponding to the received device ID and a default value thereof. That is, the request reception portion acquires the number of jobs stored in the queue.

The request reception portion judges whether the acquired queue length is greater than or equal to the acquired default value of the queue length (S207). If the judgment result indicates that the acquired queue length is greater than or equal to the default length, the request reception portion advances the processing to S208. If the acquired queue length is less than the default length, the request reception portion advances the processing to S210.

The request reception portion, having advanced the processing to S208, confirms how many printing services are set (allocated) for the queue corresponding to the received device ID. The request reception portion compares the confirmed number with a default value 604 of printing services that can be used, which is set in the queue management table 600. If the comparison result indicates that the confirmed number is less than the default value, the request reception portion advances the processing to S209. If the confirmed number is greater than or equal to the default number, the request reception portion advances the processing to S210.

Note, for example, that the number of instances of the printing service allocated to a queue can be counted with the request reception portion 4011, given that the request reception portion 4011 controls scaling out by the printing service.

In S209, the request reception portion instructs the printing service to increase the number of instances by 1. At this time, the request reception portion also needs to update the number of instances if the number of instances is stored.

In S210, the request reception portion creates a queue message according to the job. This queue message includes information indicating the storage location of the content.

The request reception portion, having created the queue message in S210, instructs the queue service 405 to add the queue message (S211). The request reception portion, having instructed that the queue message be added in S211, adds the content ID of the content corresponding to the added queue message to the processing confirmation table 610 saved in the storage provided by the storage service 406 (S212). The processing of request reception portion is as described above.

Processing of Printing System (FIG. 9)

Next, the processing of the backend processing portion (printing system) will be described with reference to FIG. 9. FIG. 9 shows in detail the processing procedure by the backend processing portion 4021 shown in FIG. 7.

The printing service issues a queue message acquisition instruction to the queue service 405 (S301). The printing service, having issued the queue message acquisition instruction in S301, confirms whether there is an unprocessed queue message (S302). If it is confirmed in S302 that there is no queue message, the printing service reconfirms whether there is a queue message in the queue (polling). If it is confirmed that there is a queue message in the queue, the queue service 405 makes the queue message whose acquisition has been instructed invisible. In other words, processing can be performed so that the queue message confirmed at S302 cannot be referenced by printing services other than the printing service that has acquired the queue message. This processing is performed by the queue service 405 rather than the printing service.

The printing service, having confirmed the queue message in S302, decodes the queue message (S303). The queue service 405 specifies the storage location of the content by decoding the queue message.

The printing service, having specified the storage location of the content in S303, acquires the content from the storage location in the storage provided by the storage service 406 (S304). The printing service, having acquired the content in S304, performs print data processing on the acquired content (S305).

At this time, the queue service 405 confirms whether the print data processing could be completed within a timeout period set for VisibilityTimeout described in the queue message (S306).

If the print data processing could be completed, the processing is advanced to S307, and if the print data processing could not be completed, the processing is advanced to S311.

The printing service, having advanced the processing to S307, saves the print data in the storage provided by the storage service 406 (S307). In S308, the printing service, having saved the print data in the storage, adds the storage location in the storage stored the print data to the processing confirmation table 610 in the storage (S308).

In S308, the printing service, having added the storage location of the print data to the processing confirmation table 610 in S308, confirms whether print processing was completed normally (S309). The printing service, having judged in S309 that the print processing was completed normally, issues a queue message deletion instruction to the queue service 405 (S310). If it is judged that the print processing was not completed normally, the printing service issues a request to the queue service indicating to return the queue message to a visible state (S311). By making the queue message visible, the printing service is again able to acquire a queue message from the queue, and perform print data processing on content corresponding to the acquired queue message.

After making the queue message visible in S311, the printing service creates, or in other words, adds an Atom feed document such as in a later-mentioned FIG. 11 or 12, in correspondence with the content for which print data creation processing has ended.

Here, the processing of FIGS. 8 and 9 can operate in parallel.

As shown in FIG. 4, a plurality of request reception portions 4011 and a plurality of backend processing portions 4021 can be started. In particular, when one document composed of a plurality of content is designated in a print instruction, it is possible that a plurality of the backend processing portions 4021 will operate to generate the print output of that document from a single request reception portion 4011. In the case where the above plurality of the backend processing portions 4021 operate, a plurality of the processes shown in the flowchart of FIG. 9 will be run concurrently. For example, in the case of the present embodiment, if pages 1-2 are in PDF format, pages 3-5 are in Microsoft Word format, and pages 6-10 are in TIFF format, three backend processing portions 4021, namely, a processing portion for generating print data from PDF format, a processing portion for generating print data from Microsoft Word format, and a processing portion for generating print data from TIFF format perform processing asynchronously and in parallel.

Figure 10:
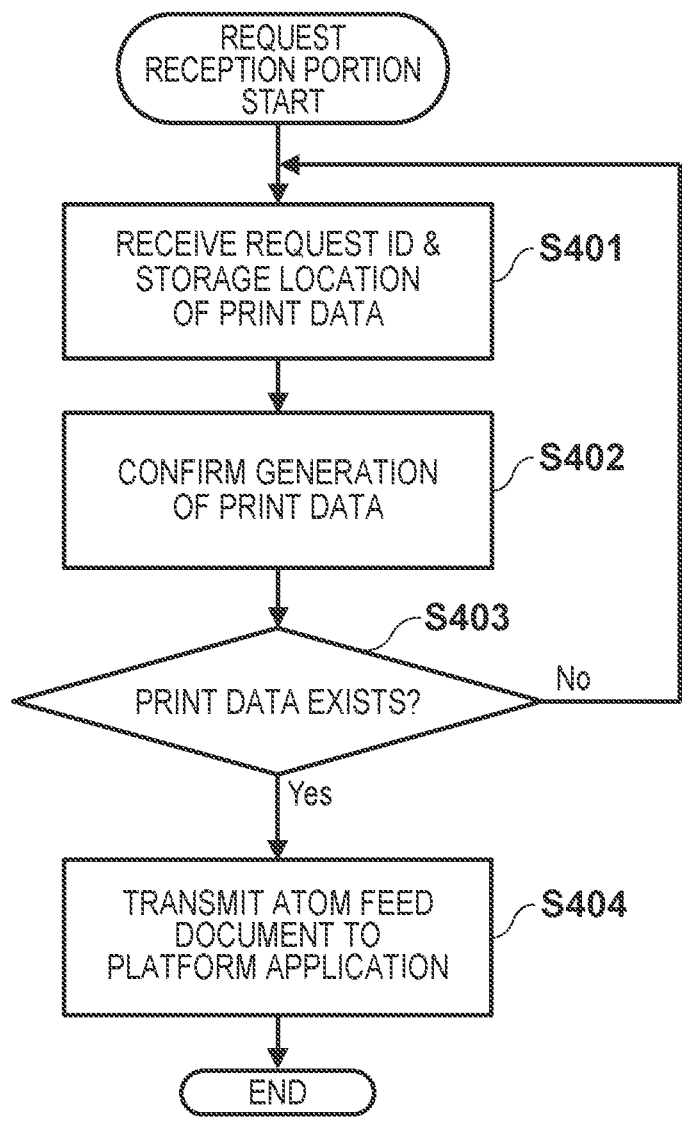
FIG. 10 is a flowchart of processing performed by the request reception unit 4011 in the case where a backend processing unit 4021 has operated.

Processing of a Plurality of Backend Processing Portions (FIG. 10)

Next, a procedure in the case where a plurality of backend processing portions 4021 operate will be described with reference to FIG. 10. FIG. 10 shows processing performed by the request reception portion 4011. Note that the printing service that will be described here is the same as the printing service of FIG. 7. Also, this processing is started from a state in which the platform application 303 is inquiring confirmation of a processing request by polling (S401). That is, processing is executed after obtaining the storage location of the print data in response to S110 in FIG. 7.

The request reception portion confirms from the processing confirmation table 610 in the storage provided by the storage service 406 on the basis of the request ID whether print data has been generated (S402). The request reception portion, having confirmed in S402 that print data has been generated, determines whether print data exists in the storage provided by the storage service 406 (S403). If it is judged in S403 that print data exists, the processing advances to S404. If it is judged that print data does not exist, the processing again starts from S401.

The request reception portion, having advanced the processing to S404, creates an XML document compliant with the Atom Syndication Format, and ends the processing.

FIGS. 11 and 12 show Atom Feed Documents output as the result of S404 of the flowchart of the request reception portion 4011 shown in FIG. 10 in the present embodiment. The Atom Feed Documents of FIGS. 11 and 12 are in accordance with the specifications of the Atom Syndication Format released by the IETF as RFC 4287.

FIG. 11 shows that the print data of pages 1-2 and pages 6-10 has been generated, and FIG. 12 shows that the print data of pages 1-2, pages 3-5 and pages 6-10 has been generated. In the present embodiment, processing is performed asynchronously and in parallel, after sharing the processing between the backend processing portions 4021 according to the format of print data to be generated or the like, such that pages 1-2, pages 3-5 and pages 6-10 are respectively processed by different backend processing portions. Here, the backend processing portions 4021 perform different processing for each piece of print data. For example, in the case of the present embodiment, if pages 1-2 are in PDF format, pages 3-5 are in Microsoft Word format, and pages 6-10 are in TIFF format, three backend processing portions 4021, that is, a processing portion for generating print data from PDF format, a processing portion for generating print data from Microsoft Word format, and a processing portion for generating print data from TIFF format perform processing asynchronously and in parallel.

The backend processing portions 4021 that operate in parallel at this time complete the print data generation processing for pages 1-2 and pages 6-10 first, as a result of the flow shown in FIG. 9. The request reception portion 4011 then generates the Atom feed document of FIG. 11 as a result of S404 of the flow in FIG. 10. The Atom Syndication Format, by definition, needs to include the following three elements in all feeds and entries. That is, a unique identifier <id> element, a title <title> element, which is a short entry title in a format that can be read by a person (a blank character string is acceptable), and a timestamp <updated> element indicating the date and time of the most recent update. Each entry includes a <link rel="alternate" . . . > element identifying an alternate version for the entry (in the present embodiment, a readme.html page serving as a description of the print data) and a <content> element representing the content of the entry itself. The type of the <content> element is <content type="application/X-iradv">, which represents that the content is print data that can be interpreted by an MFP. An Atom feed document including the above elements is generated by the request reception portion 4011, with <title> under the <feed> element being fixed, <id> being the model ID of the device that outputs the print data, and the <link> element being a URI indicating the output destination device. Also, an <entry> element is generated by the request reception portion 4011 whenever print data is generated, with the date and time of the most recent update of the Atom document being used in the ID and <title> of the <entry> element.

After the Atom feed document of FIG. 11 is generated, the backend processing portion 4021 completes the processing of pages 3-5, and the request reception portion 4011 generates the Atom feed document of FIG. 12 as a result of S404 of the flow of FIG. 10.

Processing of Platform Application (FIG. 13)

FIG. 13 is a flowchart showing Atom feed document processing and print data acquisition processing in the platform application 303 of the printing apparatus 104. The printing apparatus 104 periodically references an Atom feed URL of the request reception portion 4011 and acquires an Atom feed document, using an Atom (or RSS) feed reader function of the platform application 303. The Atom feed URL is an URL (508) of the Atom feed document indicating the output destination of the print data.

Firstly, the platform application 303 receives an Atom feed document from the request reception portion 4011 (S501). On receiving the Atom feed document, the platform application 303 analyzes the entries in the Atom feed document in order (S502). For example, in the case where the Atom feed document of FIG. 11 is received, the platform application 303 confirms the contents of generated print data with reference to the content tags from the description of the entries. In other words, from the details of the content tags, the platform application 303 finds out that the generated print data is pdl0001_1-2.zip indicating pages 1-2 and pdl0001_6-10.zip indicating pages 6-10 of the document with respect to which the print request was issued. Note that it is assumed that the generated print data is compressed, in order to effectively utilize the communication band.

The platform application 303 determines whether the print data included in an entry currently being analyzed has already been acquired (downloaded) from the storage provided by the storage service 406 (S503). If already acquired, the platform application 303 determines whether analysis of all entries has ended (S504). If analysis of all entries has ended, the platform application 303 waits to receive a new Atom feed document (S501). On the other hand, if analysis of another entry has not ended, the platform application 303 returns to the analysis processing of the next entry (S502).

On the other hand, if the print data of an entry currently being analyzed has yet to be acquired, the platform application 303 inquires a last page number P1 of print data that has been printed at that point in time from the printing unit 1042 (S505). In the case where printing has not yet been performed, however, the page number will be 0. The platform application 303 then determines whether a first page number P2 of the print data of the entry currently being analyzed is P1+1 (S506). In other words, this processing involves determining whether print data that has already been printed and print data that could subsequently be acquired have continuity of pages.

If P2=P1+1 (i.e., if there is continuity of pages), the platform application 303 (print control unit) requests the request reception portion 4011 for acquisition of the print data of the entry currently being analyzed, and acquires (downloads) the print data (S507). In other words, the platform application 303 references the URL indicating the storage location of the print data (508 in FIGS. 5A, 5B, 5C), out of the Atom feed document received at 5501, and transmits a print data acquisition request to the storage service 406. The platform application 303 (print control unit) then requests the printing unit 1042 to perform printing in accordance with the acquired print data (S508).

On the other hand, if P2≠P1+1 (i.e., if there is not continuity of pages), the platform application 303 acquires the free space of the indirect storage portion 1045 (storage) from the image processing unit 1041 (S509). The platform application 303 then determines whether the print data from page P1+1 to the last page of the entry currently being analyzed can be stored in the indirect storage portion 1045 (storage), based on the acquired free space (S510). In other words, even if the print data of the entry currently being analyzed were here to be stored in the indirect storage portion 1045, in the case where the print data of entries (called "intermediate entries") between an entry that has been printed and the entry currently being analyzed cannot be stored in the indirect storage portion 1045, the print data of these intermediate entries must ultimately be stored after erasing the print data of the entry currently being analyzed. The above determination is performed in order to avoid such unnecessary processing. If storage is not possible, the platform application 303 determines whether a suitable timeout period (e.g., 5 min) has elapsed (S512), and terminates the application after displaying error termination (S513) if the timeout period has elapsed.

If storage is possible, the platform application 303 request acquisition of the print data of the entry currently being analyzed (S511). Since pages cannot be printed in accordance with a designated order when printing is requested following S511, the platform application 303 returns to analyzing the next entry, without requesting printing (S502). On the other hand, if storage is not possible, the platform application 303 returns to analyzing the next entry (S502), without acquiring the print data of the entry currently being analyzed.

As mentioned above, according to the present embodiment, in the case where print data generation processing is performed asynchronously and in parallel with different resources, printing can be performed in a designated order, regardless of differences in the timing at which print data is generated.

Also, in the embodiments of the present invention, there is one each of the printing apparatus 104 and the client computer 105. However, a configuration may be adopted in which there are a plurality of each device.

Also, in the embodiments of the present invention, the server computer group 102 performs print data processing and sends the resultant print data to a printer. However, apart from print data processing, the server computer group 102 may perform processing for converting print data to raster images.

Also, in the embodiments of the present invention, content created with application software on the server computer group 102 is temporarily saved to a document repository. However, content need not be temporarily saved to a document repository. In this case, printing using the printing system will be as follows. The user sends a print instruction to the application software through the device browser. The application software stores the created content in one of the hardware resources in the server computer group 102.

Also, in the embodiments of the present invention, the identification information is a device ID uniquely allocated for each printing apparatus. However, the identification information need not be unique information. In this case, for example, printing apparatuses providing the same service function are regarded as one group, and one piece of identification information is allocated to each group. The identification information of printing apparatuses belonging to the same group will thereby all be the same. The queues that were allocated one for each printing apparatus will accordingly be allocated one to each group. As a result, printing apparatuses belonging to the same group will share a single queue.

Also, in the embodiments of the present invention, one server computer operates for each instance. However, a plurality of instances may operate on a single server computer. For example, in a multi-core CPU, a single instance may be allocated to one core in the CPU, or a single instance may be allocated to two cores. The method of allocating a single instance is not particularly restricted.

Also, in the embodiments of the present invention, the functions of the server computer group 102 are separated as follows: a server computer having the function of a request reception portion, a server computer having the function of a backend processing unit, and a server computer having the functions of both a queue and storage. However, the functions of the server computers need not be combined in the above manner. For example, a configuration may be adopted in which there is a server computer having the functions of both a request reception portion and a backend processing unit and a server computer having the functions of both a queue and storage. Alternatively, a configuration may be adopted in which there is a server computer having the functions of a request reception portion and a queue and a server computer having the functions of a backend processing unit and storage. What functions are realized in which server computer in order to realize the functions is thus not restricted.

Also, in the embodiments of the present invention, processing requests from the user are made from the device browser of the printing apparatus 104. However, processing requests may be sent from the device browser of the client computer 105. In this case, a configuration in which the client computer 105 designates the printing apparatus 104 is conceivable (e.g., transmits an IP address of the printing apparatus 104 together with the processing request). If the IP address is known, the request reception portion is able to send an instruction so as to poll the platform application of the designated printing apparatus 104.

Also, the queue for inserting a queue message corresponding to a processing request may be changed, according to the type of job requested for processing from the printing apparatus. For example, in the case where the processing request from the printing apparatus relates to print processing, a queue message can be inserted in a queue with respect to which the backend processing portion for executing print processing makes a queue message acquisition request. Also, in the case where the processing request from the printing apparatus relates to scan processing, a queue message can be inserted in a queue with respect to which the backend processing portion for executing scan processing makes a queue message acquisition request. Thus switching queues according to the details of processing requested from the printing apparatus has the following effects. That is, when scaling out the backend processing portion, an appropriate backend processing portion can be scaled out. For example, in the case where the backend processing portion for executing print processing is responsible for a large amount of processing, the backend processing portion for executing print processing can be scaled out, without scaling out the backend processing portion for executing scan processing. Efficient scaling out can thereby be realized.

Other Embodiments

Aspects of the present invention can also be realized by a computer of a system or apparatus (or devices such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-173964, filed Aug. 2, 2010, which is hereby incorporated by reference herein in its entirety.

What is claimed is:

1. A printing system comprising a server apparatus and a printing apparatus connected to the server apparatus via a network, comprising:
    a plurality of print data generation units provided in the server apparatus and configured to share content serving as print source data in accordance with an instruction transmitted from outside of the server apparatus via the network, and generate print data asynchronously and in parallel;
    a storage unit provided in the server apparatus and configured to store print data generated by each of the plurality of print data generation units in a storage of the server apparatus in the generated order;
    an inquiry unit provided in the printing apparatus and configured to periodically inquire whether print data is stored in the storage of the server apparatus;
    a document generation unit provided in the server apparatus and configured, when there is an inquiry by the inquiry unit, and print data generated by any of the plurality of print data generation units is stored in the storage of the server apparatus, to generate a document including a storage location of the print data;
    an analysis unit provided in the printing apparatus and configured to receive the document generated by the document generation unit from the server apparatus, and analyze information contained in the document; and
    a print control unit provided in the printing apparatus and configured, when a first page number of the print data analyzed by the analysis unit and a last page number of print data already acquired by the printing apparatus are continuous, to acquire the print data from the storage location analyzed by the analysis unit and print the acquired print data,
    wherein the print control unit, when the last page number of print data already printed and the first page number of the print data analyzed by the analysis unit are not continuous, and the print data therebetween and the print data analyzed by the analysis unit can be stored in a storage of the printing apparatus, acquires the print data analyzed by the analysis unit from the storage location and does not perform printing.

2. The printing system according to claim 1,
    wherein the print control unit, when the last page number of print data already printed and the first page number of the print data analyzed by the analysis unit are not continuous, and the print data therebetween and the print data analyzed by the analysis unit cannot be stored in the storage of the printing apparatus, does not acquire the print data analyzed by the analysis unit.

3. The printing system according to claim 1,
    wherein the plurality of print data generation units share content serving as print source data according to a format of print data to be generated, and generate print data asynchronously and in parallel.

4. The printing system according to claim 1,
    wherein the server apparatus further includes a content acquisition unit configured to acquire content serving as print source data from an external apparatus different from the printing apparatus, in accordance with an instruction transmitted from outside of the server apparatus via the network, and
    the plurality of print data generation units share the content acquired by the content acquisition unit, and generate print data asynchronously and in parallel.

5. The printing system according to claim 1,
    wherein the printing apparatus includes a Web browser configured to display an operation screen for accepting an instruction from a user.

6. A printing apparatus connected via a network to a server apparatus that includes a print data generation unit configured to share content serving as print source data and generate print data asynchronously and in parallel, comprising:

an inquiry unit configured to periodically inquire whether print data is stored in a storage of the server apparatus;

an analysis unit configured to receive, when there is print data stored in the storage of the server apparatus, a document including a storage location of the print data from the server apparatus, and analyze information contained in the document; and a print control unit configured, when a first page number of the print data analyzed by the analysis unit and a last page number of print data already printed are continuous, to acquire the print data from the storage location analyzed by the analysis unit and print the acquired print data, wherein the print control unit, when the last page number of print data already printed and the first page number of the print data analyzed by the analysis unit are not continuous, and the print data therebetween and the print data analyzed by the analysis unit can be stored in a storage of the printing apparatus, acquires the print data analyzed by the analysis unit from the storage location and does not perform printing.

7. A printing system control method for execution by a printing system that includes a server apparatus and a printing apparatus connected to the server apparatus via a network, comprising:

sharing content serving as print source data in accordance with an instruction transmitted from outside of the server apparatus via the network, and generating print data asynchronously and in parallel;

storing generated print data in a storage of the server apparatus in the generated order;

periodically inquiring whether print data is stored in the storage of the server apparatus;

generating, when there is an inquiry from the printing apparatus, and print data is stored in the storage of the server apparatus, a document including a storage location of the print data;

receiving the generated document from the server apparatus, and analyzing information contained in the document; and acquiring, when a first page number of the analyzed print data and a last page number of print data already acquired by the printing apparatus are continuous, the print data from the analyzed storage location and printing the acquired print data, wherein, when the last page number of print data already printed and the first page number of the analyzed print data are not continuous, and the print data therebetween and the analyzed print data can be stored in a storage of the printing apparatus, the analyzed print data is acquired from the storage location and printing is not performed.

8. A printing apparatus control method for execution by a printing apparatus connected via a network to a server apparatus that includes a print data generation unit configured to share content serving as print source data and generate print data asynchronously and in parallel, comprising:

periodically inquiring whether print data is stored in a storage of the server apparatus;

receiving, when there is print data stored in the storage of the server apparatus, a document including a storage location of the print data from the server apparatus, and analyzing information contained in the document; and acquiring, when a first page number of the analyzed print data and a last page number of print data already printed are continuous, the print data from the analyzed storage location and printing the acquired print data, wherein, when the last page number of print data already printed and the first page number of the analyzed print data are not continuous, and the print data therebetween and the analyzed print data can be stored in a storage of the printing apparatus, the analyzed print data is acquired from the storage location and printing is not performed.

9. A non-transitory computer readable medium in which a program is stored for causing a computer to function as:

a plurality of print data generation units provided in a server apparatus in a printing system that includes the server apparatus and a printing apparatus connected to the server apparatus via a network, and configured to share content serving as print source data in accordance with an instruction transmitted from outside of the server apparatus via the network, and generate print data asynchronously and in parallel;

a storage unit provided in the server apparatus and configured to store print data generated by each of the plurality of print data generation units in a storage of the server apparatus in the generated order;

an inquiry unit provided in the printing apparatus and configured to periodically inquire whether print data is stored in the storage of the server apparatus;

a document generation unit provided in the server apparatus and configured, when there is an inquire by the inquiry unit, and print data generated by any of the plurality of print data generation units is stored in the storage of the server apparatus, to generate a document including a storage location of the print data;

an analysis unit provided in the printing apparatus and configured to receive the document generated by the document generation unit from the server apparatus, and analyze information contained in the document; and a print control unit provided in the printing apparatus and configured, when a first page number of the print data analyzed by the analysis unit and a last page number of print data already printed are continuous, to acquire the print data from the storage location analyzed by the analysis unit and print the acquired print data, wherein the print control unit, when the last page number of print data already printed and the first page number of the print data analyzed by the analysis unit are not continuous, and the print data therebetween and the print data analyzed by the analysis unit can be stored in a storage of the printing apparatus, acquires the print data analyzed by the analysis unit from the storage location and does not perform printing.

10. A non-transitory computer readable medium in which a program is stored for causing a computer to function as:

an inquiry unit provided in a printing apparatus connected via a network to a server apparatus that includes a print data generation unit configured to share content serving as print source data and generate print data asynchronously and in parallel, and configured to periodically inquire whether print data is stored in a storage of the server apparatus;

an analysis unit provided in the printing apparatus and configured to receive, when there is print data stored in the storage of the server apparatus, a document including a storage location of the print data from the server apparatus, and analyze information contained in the document; and a print control unit provided in the printing apparatus and configured, when a first page number of the print data analyzed by the analysis unit and a last page number of print data already printed are continuous, to acquire the print data from the storage location analyzed by the analysis unit and print the acquired print data, wherein the print control unit, when the last page number of print data already printed and the first page number of the print data analyzed by the analysis unit are not continuous, and the print data therebetween and the print data analyzed by the analysis unit can be stored in a storage of the printing apparatus, acquires the print data analyzed by the analysis unit from the storage location and does not perform printing.

* * * * *